W. EHRLICH.
BAKER'S OVEN.
APPLICATION FILED APR. 8, 1916.

1,277,885.

Patented Sept. 3, 1918.
2 SHEETS—SHEET 2.

Witnesses:
H. S. Bull
B. G. Richards

Inventor,
William Ehrlich,
by Joshua R. H. Potts
his Attorney.

UNITED STATES PATENT OFFICE.

WILLIAM EHRLICH, OF CHICAGO, ILLINOIS, ASSIGNOR TO CASE & MARTIN COMPANY, OF CHICAGO, ILLINOIS, A CORPORATION OF ILLINOIS.

BAKER'S OVEN.

1,277,885.

Specification of Letters Patent.

Patented Sept. 3, 1918.

Application filed April 8, 1916. Serial No. 89,848.

*To all whom it may concern:*

Be it known that I, WILLIAM EHRLICH, a citizen of the United States, and a resident of the city of Chicago, county of Cook, and State of Illinois, have invented certain new and useful Improvements in Bakers' Ovens, of which the following is a specification.

My invention relates to improvements in bakers' ovens especially adapted for use in baking pies, and has for its object the provision of an improved construction of this character arranged to bake pies or other articles with great expedition and efficiency.

The invention consists in the combinations and arrangements of parts hereinafter described and claimed.

Figure 1:
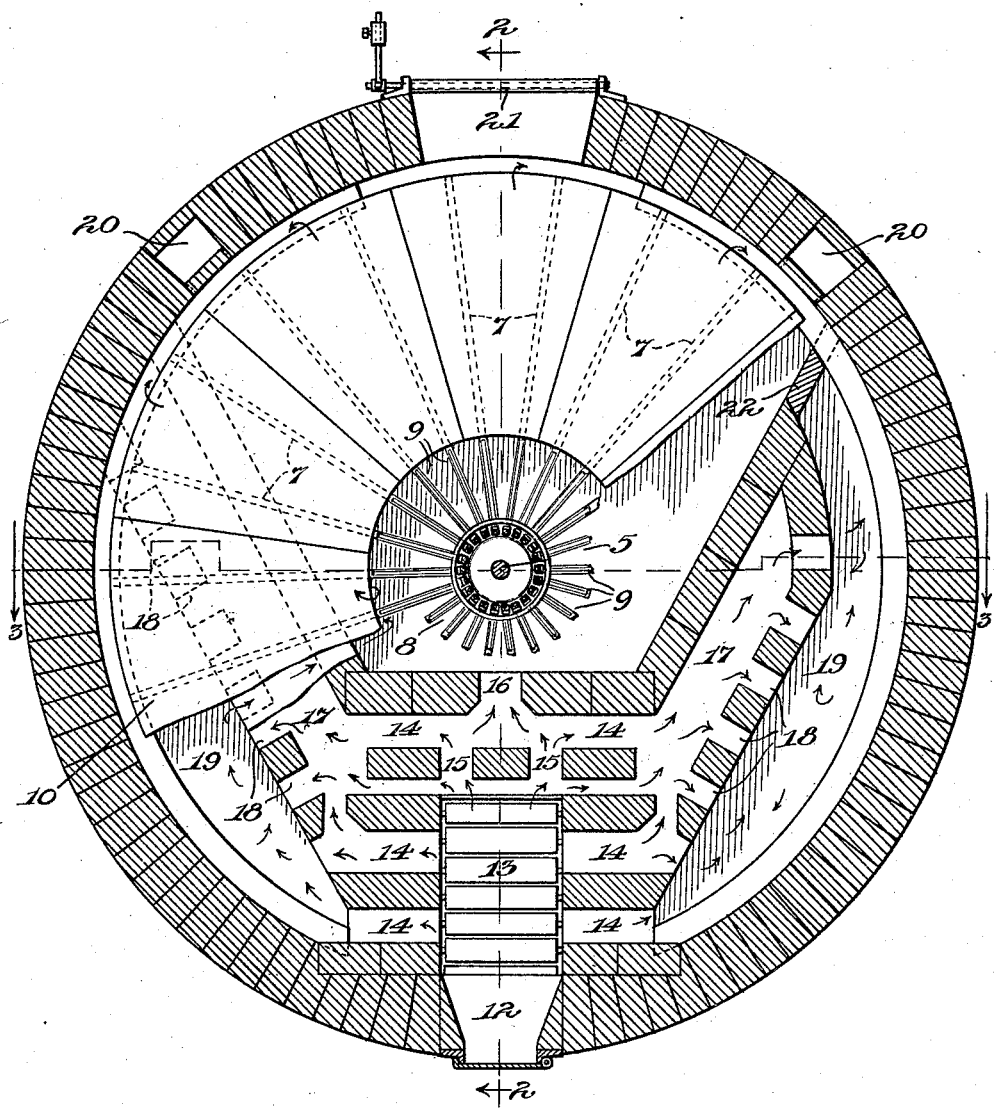
Figure 2:
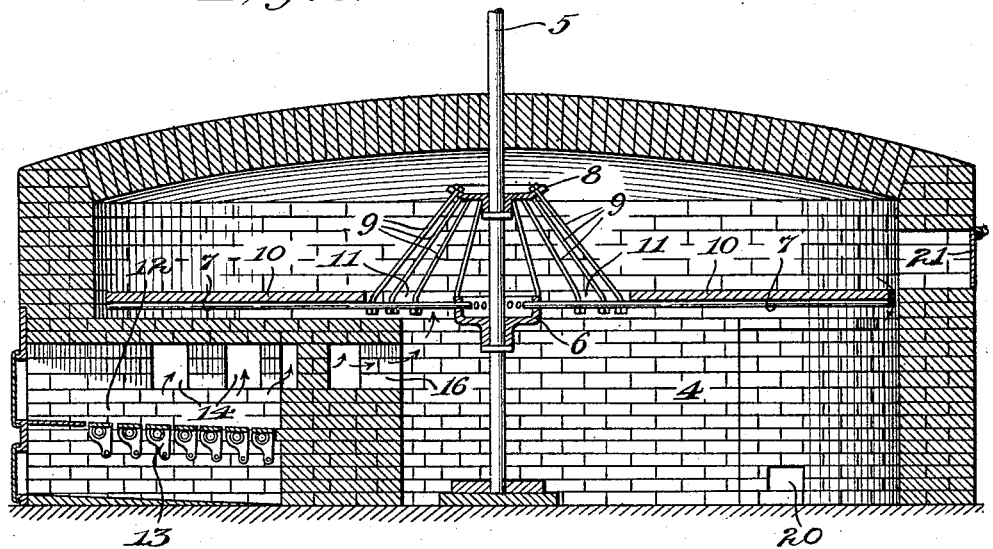

The invention will be best understood by reference to the accompanying drawings forming a part of this specification, and in which;

Figure 1 is a horizontal section of an oven embodying my invention,

Fig. 2, a section taken on line 2—2 of Fig. 1, and

Figure 3:
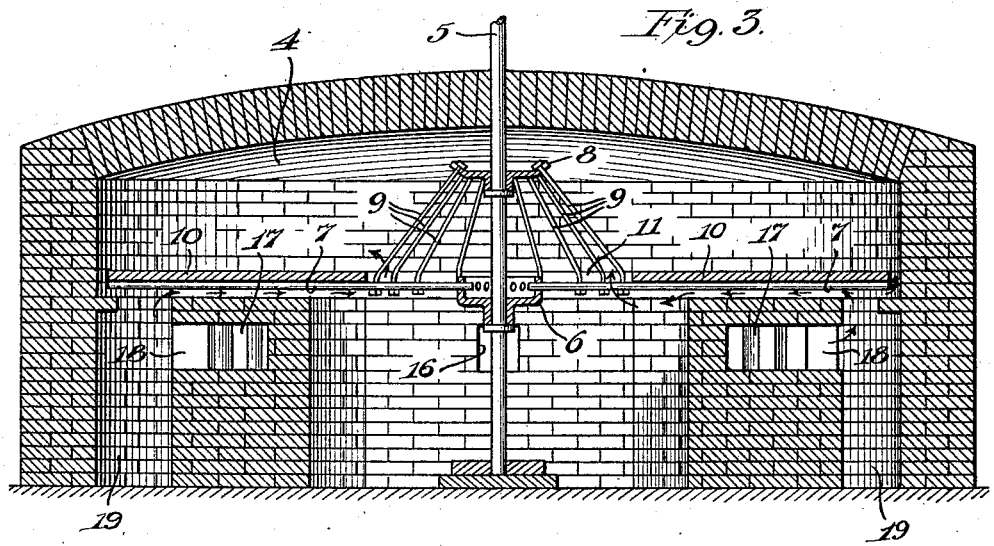

Fig. 3, a section taken on line 3—3 of Fig. 1.

The preferred form of construction, as illustrated in the drawings, comprises a circular oven chamber 4 having a vertical revolving shaft 5 extending centrally therethrough and projecting from the top thereof. Shaft 5 carries a supporting ring or collar 6 and a plurality of supporting rods 7 are secured at their inner ends in said ring. Another supporting ring or collar 8 is secured to shaft 5 above ring 6 and depending divergent hanger rods 9 connect said collar 8 with the rods 7 to support the latter. A plurality of sector-shaped slabs of soapstone 10 are arranged on rods 7 and form a substantially horizontal baking table a little smaller than the chamber 4 and provided with a central draft opening 11. A fire chamber 12 is arranged in the lower portion of chamber 4 at one side thereof and a fire grate 13 is arranged in said fire chamber to provide heating means for chamber 4. Heating flues 14 lead laterally from fire chamber 12 and heating flues 15 lead from the inner end thereof, there being one flue 16 leading directly into baking chamber 4 from the inner end of fire chamber 12. Divergent flues 17 lead from flues 14 and communicate through flues 18 with heating chambers 19 situated adjacent the inner walls of oven chamber 4 and opening upwardly under the corresponding outer edges of table 10. Draft flues 20 communicate with oven chamber 4 below table 10 and a suitable door 21 is provided to give access to said oven chamber on the side directly opposite the fire chamber 12. A readily removable loose brick wall 22 is provided to give access from one of the heating chambers 19 to the lower portion of oven chamber 4, as indicated.

By this arrangement, it will be observed, that the hot products of combustion will be drawn largely out through the flues 17 and into the heating chambers 19 passing upwardly under the corresponding outer edges of table 10. Thence said products of combustion will pass inwardly under the bottom of said table to the central opening 11 therethrough. The hot products of combustion then pass upwardly through opening 11 and outwardly over the top of the corresponding portions of table 10 and downwardly past the edges of said table to flues 20, thus subjecting both the top and bottom of said portions of said table to the direct application of heat. This arrangement has been found to be highly useful in baking, especially in the baking of pies, imparting the proper degree of browning to the top crust of the pies. The pies are placed on the table through the door 21 and also are removed through said door, said door being located at the side of said chamber directly opposite the heating chamber 12 and thus in the coolest portion of the oven.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A baker's oven comprising a substantially circular oven chamber; a fire grate under one side of said chamber, there being divergent flues leading from said grate through the lower portion of said oven chamber and communicating with flues situated adjacent the walls of said chamber and opening upwardly; there being an imperforate wall covering said grate and said divergent flues; a revolving baking table in said chamber partially overlying said grate and arranged but slightly above said imperforate wall, said table being provided with a central opening; draft flues communicating with said chamber beyond said divergent flues and below said table; and a door giving access to said table at the side opposite said grate, substantially as described.

2. A baker's oven comprising a substantially circular oven chamber; a fire grate under one side of said chamber, there being divergent flues of comparatively great passage leading from said grate through the lower portion of said oven chamber and communicating with flues situated adjacent the walls of said chamber and opening upwardly, there being an imperforate wall covering said grate and said divergent flues, and there also being a comparatively restricted flue leading inwardly from said grate into said chamber; a revolving baking table in said chamber, partially overlying said grate and arranged but slightly above said imperforate wall, said table being provided with a central opening, said table being somewhat smaller than said chamber to leave draft passage around the edges thereof; draft flues communicating with said chamber beyond said divergent flues and below said table; and a door giving access to said table opposite said grate, substantially as described.

3. A baker's oven comprising a substantially circular oven chamber, a fire grate at one side of said chamber, there being divergent flues leading from said grate through the lower portion of said oven chamber, an imperforate wall covering said grate and said divergent flues, there being upwardly opening flues arranged between the walls of said chamber and said adjacent flues and communicating with the latter, a revolving baking table in said chamber partially overlying said imperforate wall and arranged but a slight distance above the same, said table being provided with a central opening, draft flues communicating with said chamber beyond said divergent flues and below said table, and a door giving access to said table at the opposite side from said grate, substantially as described.

4. A baker's oven comprising a substantially circular oven chamber, a fire grate in one side of said chamber, there being divergent flues of comparatively large cross section leading from said grate through the lower portion of said chamber, a horizontal wall covering said grate and said divergent flues, there being flues arranged between the walls of said chamber and said divergent flues, in communication with the latter and opening upwardly, there also being a comparatively restricted flue leading inwardly from said grate into said chamber, a revolving baking table in said chamber partially overlying said grate and flues and arranged in a plane slightly above the wall covering said grate and flues, said table being provided with a central opening and being somewhat smaller in diameter than said chamber to leave draft passage around the periphery thereof, draft flues communicating with said chamber beyond said divergent flues and below said table and the level of the first mentioned flues, and a door giving access to said table opposite said grate, substantially as described.

In testimony whereof I have signed my name to this specification in the presence of two subscribing witnesses.

WILLIAM EHRLICH.

Witnesses:
JOSHUA R. H. POTTS,
HELEN F. LILLIS.

Copies of this patent may be obtained for five cents each, by addressing the "Commissioner of Patents, Washington, D. C."